(12) United States Patent
Inoue

(10) Patent No.: US 11,805,216 B2
(45) Date of Patent: Oct. 31, 2023

(54) IMAGE PROCESSING DEVICE AND IMAGE PROCESSING METHOD CAPABLE OF READING DOCUMENT SELECTIVELY ATTACHED WITH A TAG

(71) Applicant: SHARP KABUSHIKI KAISHA, Osaka (JP)

(72) Inventor: Yasuhiro Inoue, Osaka (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 17/215,627

(22) Filed: Mar. 29, 2021

(65) Prior Publication Data

US 2021/0306511 A1 Sep. 30, 2021

(30) Foreign Application Priority Data

Mar. 30, 2020 (JP) ................. 2020-060275

(51) Int. Cl.
*G06F 3/12* (2006.01)
*H04N 1/32* (2006.01)
*G06V 30/413* (2022.01)
*G06V 30/414* (2022.01)

(52) U.S. Cl.
CPC ....... *H04N 1/32128* (2013.01); *G06V 30/413* (2022.01); *G06V 30/414* (2022.01)

(58) Field of Classification Search
None
See application file for complete search history.

(56) References Cited

U.S. PATENT DOCUMENTS

| 5,787,295 | A | * | 7/1998 | Nakao | G06F 3/0481 |
| | | | | | 715/250 |
| 7,424,974 | B2 | * | 9/2008 | Hull | G06K 7/0008 |
| | | | | | 235/382 |
| 8,159,705 | B2 | * | 4/2012 | Urakawa | H04N 1/32138 |
| | | | | | 358/1.15 |
| 9,628,637 | B2 | * | 4/2017 | Ohshita | G06F 16/9554 |
| 2005/0105724 | A1 | * | 5/2005 | Hull | G06K 7/0008 |
| | | | | | 380/200 |
| 2006/0098901 | A1 | * | 5/2006 | Hino | H04N 1/32133 |
| | | | | | 382/306 |
| 2008/0309988 | A1 | * | 12/2008 | Johnson | H04N 1/32769 |
| | | | | | 358/462 |

(Continued)

FOREIGN PATENT DOCUMENTS

JP 2007-159065 A 6/2007
JP 2009-089294 A 4/2009

(Continued)

*Primary Examiner* — Dung D Tran
(74) *Attorney, Agent, or Firm* — ScienBiziP, P.C.

(57) ABSTRACT

An image processing device reads a plurality of documents selectively attached with a tag, and processes the read document images with a tag. The image processing device includes a tag information extractor that extracts tag information about a tag from the document images with a tag, and an image processor that separately generates, based on the tag information, document images without a tag in which a tag is removed from the document images with a tag, and a tag information image in which the tag information about the document images without a tag is written.

11 Claims, 17 Drawing Sheets

(56) References Cited

U.S. PATENT DOCUMENTS

| | | | |
|---|---|---|---|
| 2009/0244583 A1* | 10/2009 | Ogasawara | G03G 15/5025 358/1.13 |
| 2011/0255113 A1* | 10/2011 | Wei | H04N 1/32416 358/1.13 |
| 2014/0258214 A1* | 9/2014 | Tsukamoto | H04L 12/1831 707/608 |
| 2017/0004389 A1 | 1/2017 | Oguro | |
| 2019/0012303 A1* | 1/2019 | Okamoto | G06F 16/2358 |
| 2020/0358915 A1* | 11/2020 | Kawasaki | G06K 9/00463 |

FOREIGN PATENT DOCUMENTS

| | | | |
|---|---|---|---|
| JP | 2010-088037 A | | 4/2010 |
| JP | 2010088037 A | * | 4/2010 |
| JP | 2017-017455 A | | 1/2017 |

* cited by examiner

FIG. 10
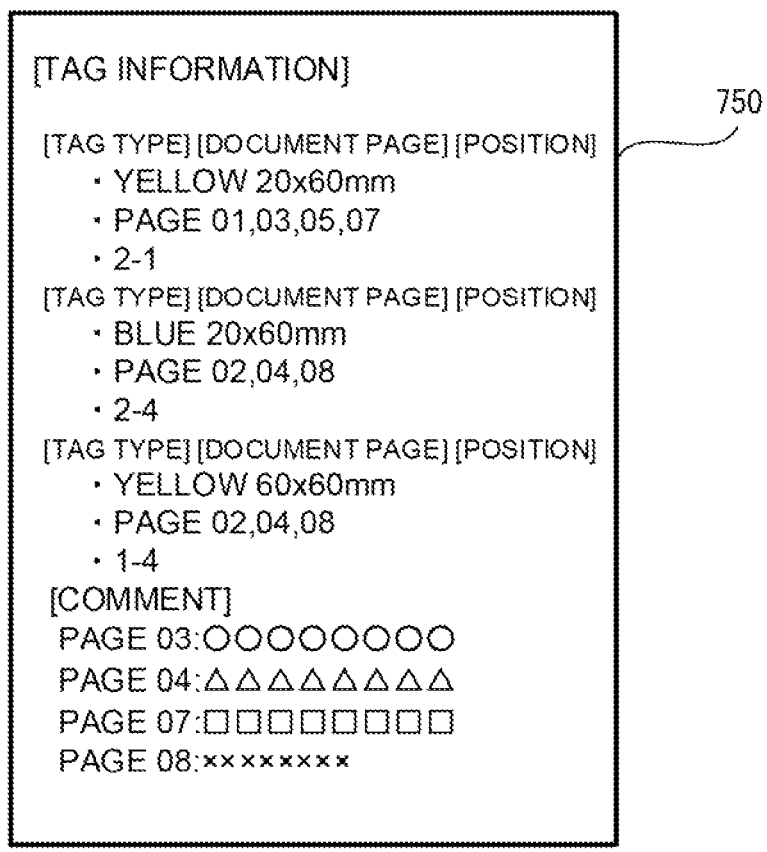
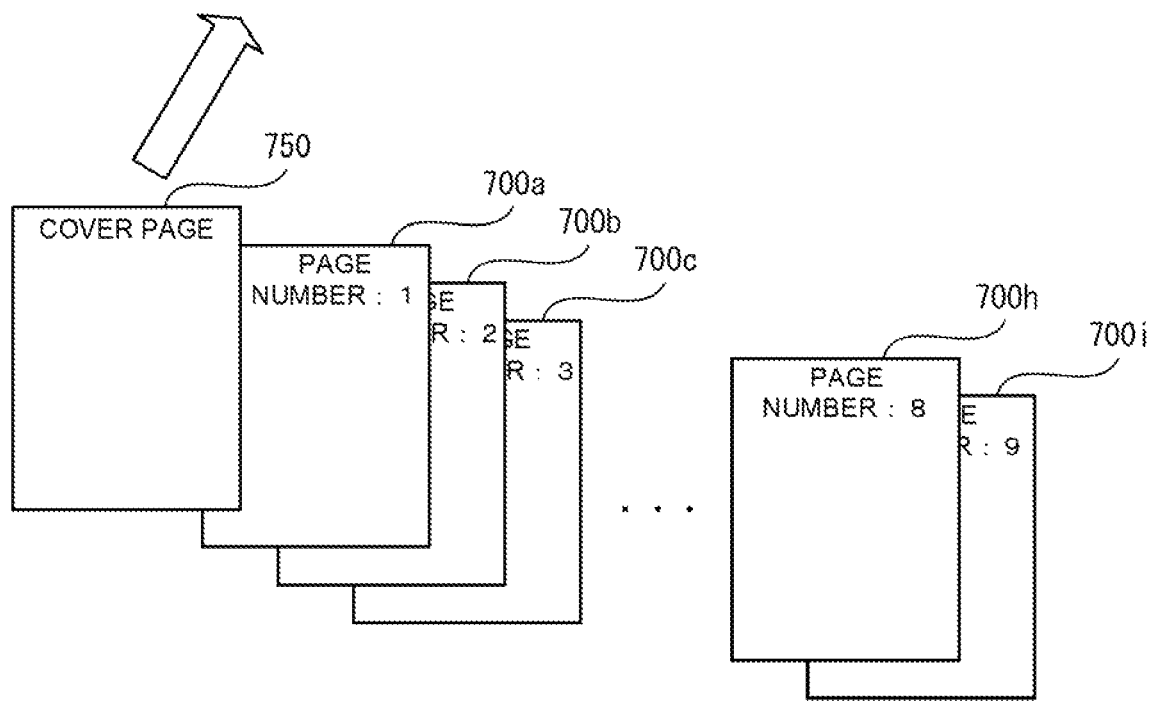

FIG. 16
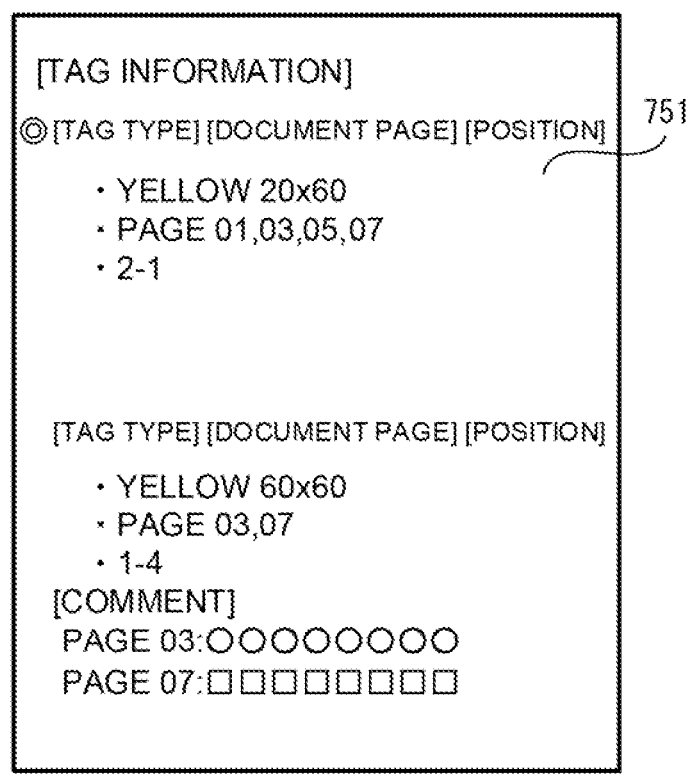
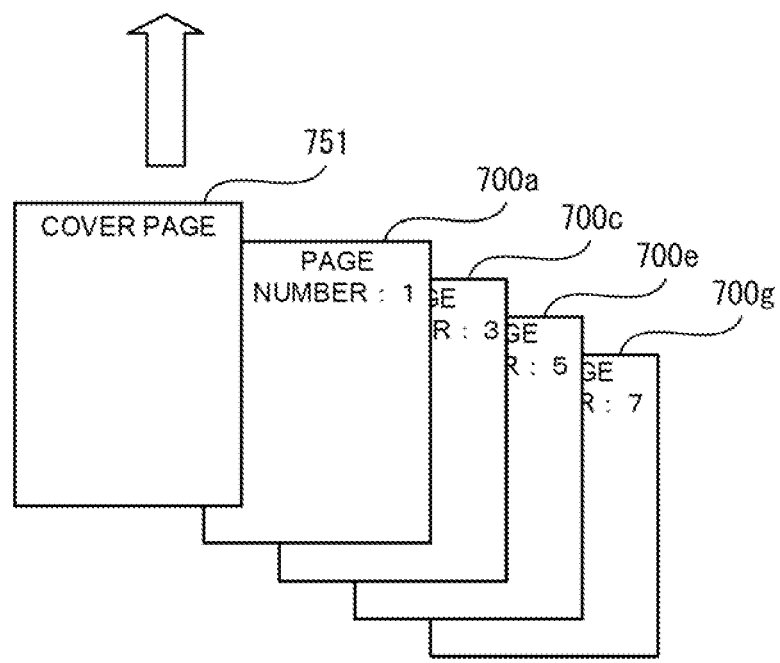

FIG. 17
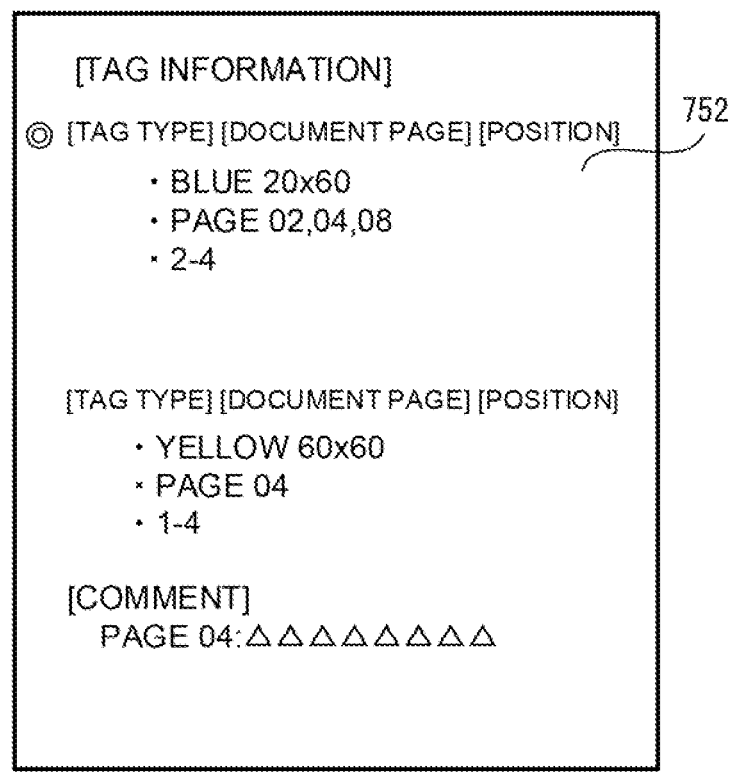
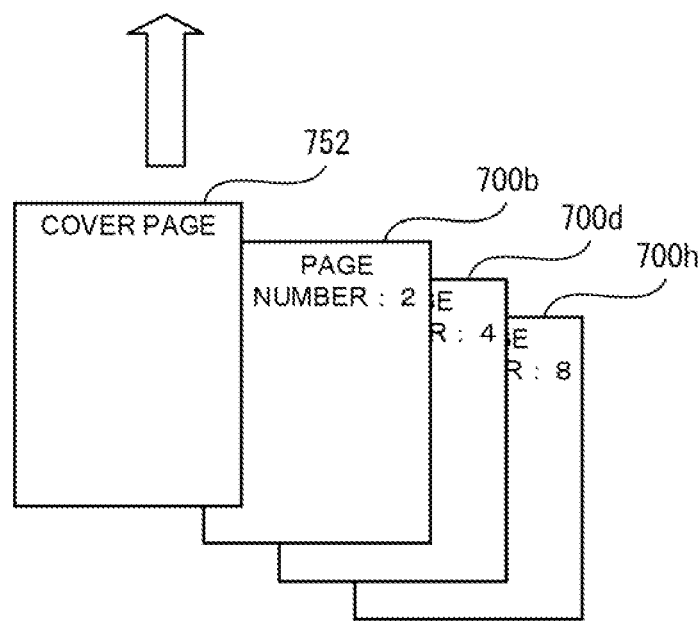

FIG. 18
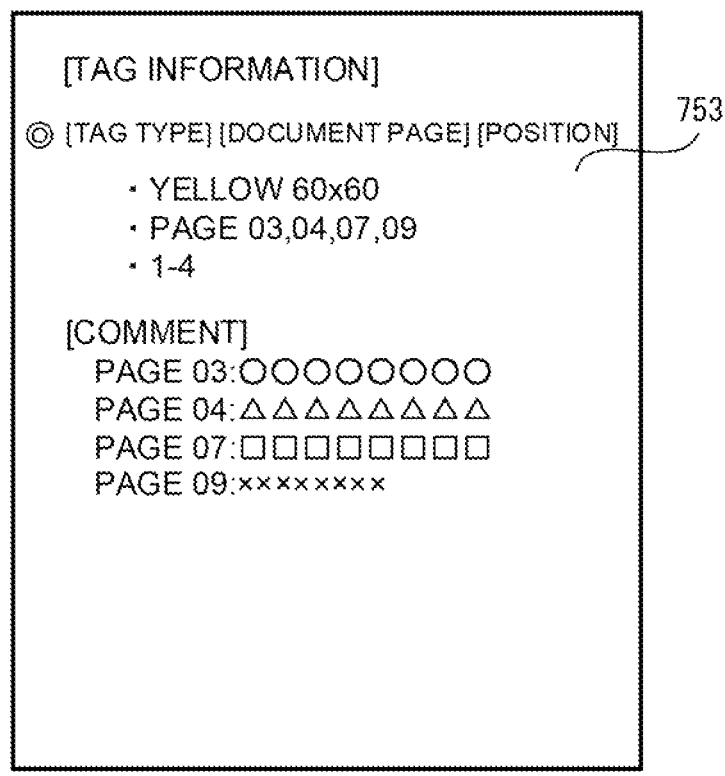
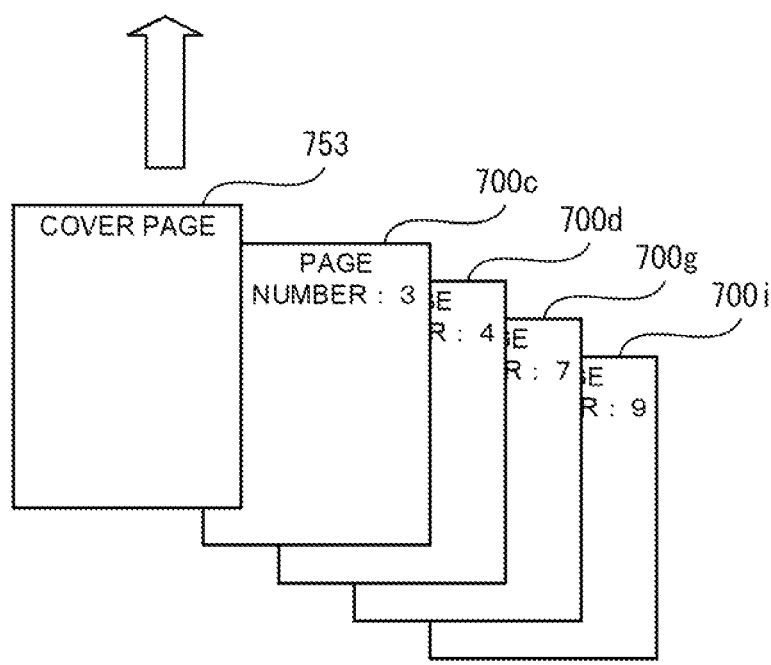

IMAGE PROCESSING DEVICE AND IMAGE PROCESSING METHOD CAPABLE OF READING DOCUMENT SELECTIVELY ATTACHED WITH A TAG

CROSS-REFERENCE TO RELATED APPLICATION

The present application claims priority from Japanese Application JP 2020-60275, the content to which is hereby incorporated by reference into this application.

BACKGROUND OF THE INVENTION

Field of the Invention

The present invention relates to an image processing device and an image processing method capable of reading a document selectively attached with a tag and separately outputting a document image of the document in a state where no tag is attached to the document and information about the tag.

Description of the Background Art

Conventionally, a tag may be attached to a document for classification and commenting. The document with a tag is read by a scanner or the like to be converted into data, or is copied.

However, if the document with a tag is read, a portion with the tag may look dirty. In some cases, a comment written on the tag may not be desired to be described on the document. Furthermore, in classification based on a type (color, size, etc.) of a tag, there is no choice but to rely on manual efforts, and the manual sorting has a high risk of losing the document and of peeling off the tag.

Therefore, in the invention of Japanese Unexamined Patent Application Publication No. 2007-159065 (hereinafter, referred to as Patent Document 1), when a document with a tag is read, a tag portion is recognized and an image in which only the tag portion is removed is created.

In the invention of Japanese Unexamined Patent Application Publication No. 2009-89294 (hereinafter, referred to as Patent Document 2), when a tab sheet is used, a content written on a tag is transcribed to a tab portion.

In the invention of Japanese Unexamined Patent Application Publication No. 2010-88037 (hereinafter, referred to as Patent Document 3), tag images are extracted from a plurality of documents with an attached tag and the tag images are combined with document images in an overlapping manner at a predetermined position of the document images on the first page of each group of documents, or a cover page is attached to another cover sheet, so that a user can easily determine whether the documents belong to the same group.

However, in the invention of Patent Document 1, information about the attached tag is removed, and thus, it is difficult to trace a history of the tag such as a type of the tag and a manner in which the tag is attached.

In the invention of Patent Document 2, a tab sheet (a special sheet) is necessary, and an ordinary user prepares a tab sheet with difficulty.

The invention of Patent Document 3 is characterized in that documents are grouped using a delimitation by a tag, however, may not be employed if the documents are not arranged in order although the read documents are grouped.

In view of these circumstances, the present invention provides an image processing device and an image processing method capable of processing a document image of a document selectively attached with a tag to obtain a document image without a tag, and outputting tag information about the document image without a tag as a tag information image, separately from the document image without a tag.

Further, the present invention provides an image processing device and an image processing method capable of grouping document images, based on tag information, to output a tag information image and a document image without a tag for each group of the document images.

SUMMARY OF THE INVENTION

The present invention is characterized in that, in an image processing device for reading a plurality of documents selectively attached with a tag to generate document images and processing the generated document images, the image processing device includes a tag information extractor that extracts tag information about a tag from the document images, an image processor that removes, based on the tag information, a tag from document images with a tag to generate document images as document images without a tag, generates a tag information image in which the tag information is written, and associates the document images without a tag with the tag information image, and an image outputter that outputs the associated document images without a tag and tag information image.

The image processor is characterized in that the image processor groups the document images without a tag, based on the tag information, and generates the document images without a tag and the tag information image in an associated manner for every group.

The present invention is characterized in that, in an image processing method for reading a plurality of documents selectively attached with a tag to generate document images and processing the generated document images, the image processing method includes extracting tag information about a tag from the document images, removing, based on the tag information, a tag from the document images with a tag to generate document images as document images without a tag, generating a tag information image in which the tag information is written, and associating the document images without a tag with the tag information image, and outputting the associated document images without a tag and tag information image.

According to the present invention, a document with a tag is read to generate a document image without a tag and generate tag information as a tag information image separately from the document image without a tag. Thereby, it is possible to output and print an original document without a tag as well as the tag information for the original document, and thus, the present invention may exhibit an excellent effect in which the tag information is maintained without being lost.

According to the present invention, it is possible to group documents, based on tag information, and output a tag information image and document images without a tag for each group, and thus, even if the documents are read in any order, in grouping the documents, manual efforts are saved.

BRIEF DESCRIPTION OF THE DRAWINGS

FIG. 10 is an explanatory diagram illustrating an output tag information image and an output document image;

FIG. 16 is an explanatory diagram illustrating a tag information image and document images grouped by a yellow tag 610;

FIG. 17 is an explanatory diagram illustrating a tag information image and document images grouped by a blue tag 620; and FIG. 18 is an explanatory diagram illustrating a tag information image and document images grouped by a yellow tag 630.

DESCRIPTION OF THE PREFERRED EMBODIMENTS

An embodiment of the present invention will be described below with reference to the drawings.

First Embodiment

A first embodiment of the present invention is an image forming apparatus including an image processing device according to the present invention, and the image forming apparatus reads a document selectively attached with a tag and separately outputs a document image in a state where no tag is attached to the document and an image in which tag information about the tag is written.

Configuration of Image Forming Apparatus

Figure 1:
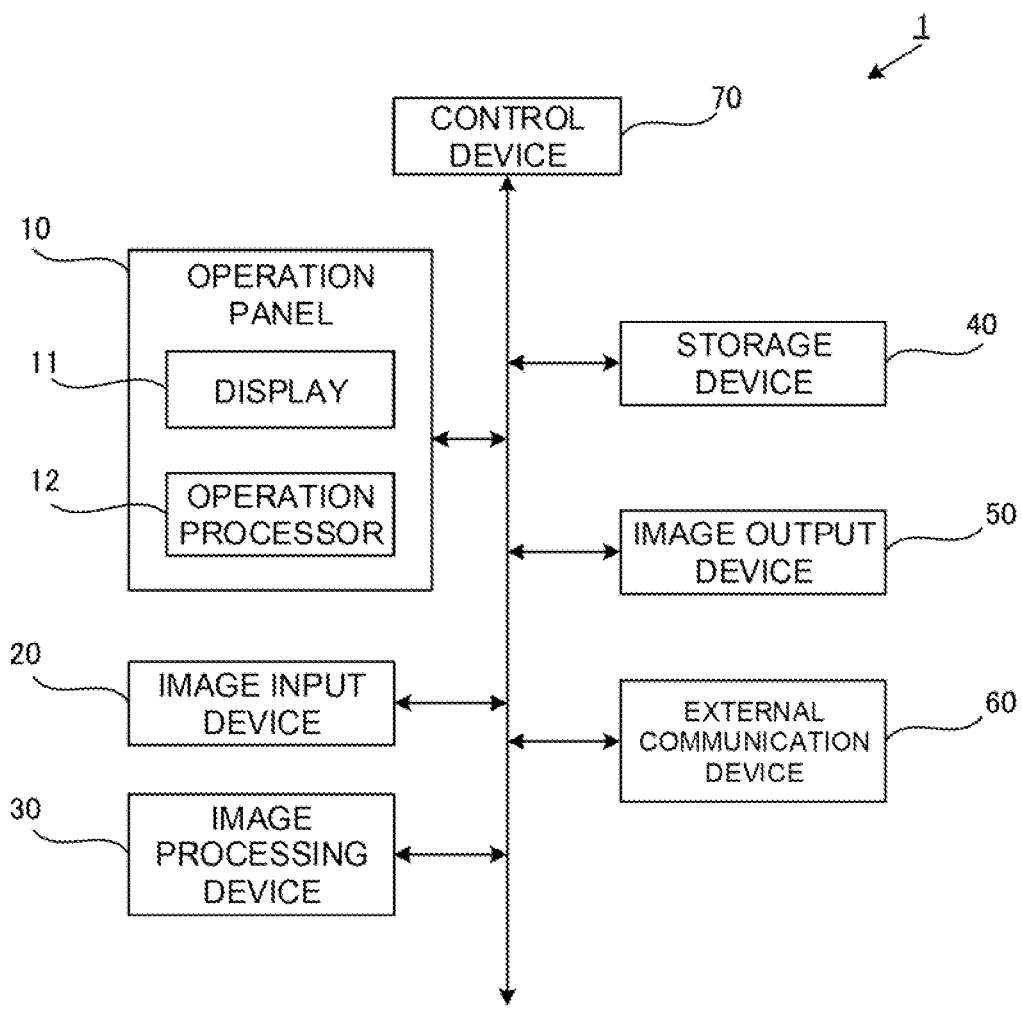
FIG. 1 is a block diagram illustrating an image forming apparatus of a first embodiment according to the present invention.

An image forming apparatus 1 according to a first embodiment is a digital multifunction peripheral (MFP) including a copy function, a printing function, and a scanner function. As illustrated in FIG. 1, the image forming apparatus 1 includes an operation panel 10 that receives an input operation, an image input device 20, an image processing device 30, a storage device 40, an image output device 50, an external communication device 60, and a control device 70.

The operation panel 10 includes a display 11 including a liquid crystal display or the like, and an operation processor 12 including a setting button and a numeric keypad through which a user sets an operation mode of the image forming apparatus 1. The operation processor 12 may be realized by a hardware input device including a switch, a keyboard, or a pointing device such as a mouse, or may be realized by a touch panel or the like formed integrally with the display 11.

The image input device 20 optically reads an image from a document. The image input device 20 includes, for example, a color scanner having a charge coupled device (CCD), reads a reflected light image from a document as an RGB (R: red, G: green, B: blue) or monochrome analog signal using the CCD, and outputs the analog signal to the image processing device 30.

The image processing device 30 converts the analog image signal transmitted from the image input device 20 into digital image data and performs an image process. The image data subjected to the image process is transmitted to the image output device 50.

The storage device 40 is a data storage device including a hard disk, or a storage medium such as a solid state drive (SSD), and a flash memory for temporarily saving image data handled by the image processing device 30. The storage device 40 preliminarily records information about a plurality of candidate output gradation numbers and other various setting information, and temporarily saves image data created as a result of an image process calculation during the image process.

The image output device (for example, a printer) 50 prints an image (forms an image) of the image data transmitted from the image processing device 30 on a recording medium (for example, paper and a recording sheet). Examples of the image output device 50 include a color printer using an electrophotographic scheme. The image data may be output to an external storage medium such as a USB memory, another device, or the storage device 40 of the image forming apparatus 1.

The external communication device 60 communicates with another device via a network. For example, the external communication device 60 includes an interface connectable to a network, and may communicate with another device via a wired/wireless local area network (LAN). The external communication device 60 may receive image data from another device (for example, a universal serial bus (USB) memory) or transmit image data to another device by using a USB interface or the like.

The control device 70 is a computer including a processor such as a central processing unit (CPU) or a digital signal processor (DSP) and comprehensively controls various types of hardware provided in the image forming apparatus 1. The control device 70 has a function of controlling data transfer between the hardware components provided in the image forming apparatus 1. Further, the control device 70 has a function of controlling data communication with a computer, another digital multifunction peripheral, and the like connected to the network, via a network card and a LAN cable (not illustrated).

Configuration of Image Processing Device

Figure 2:
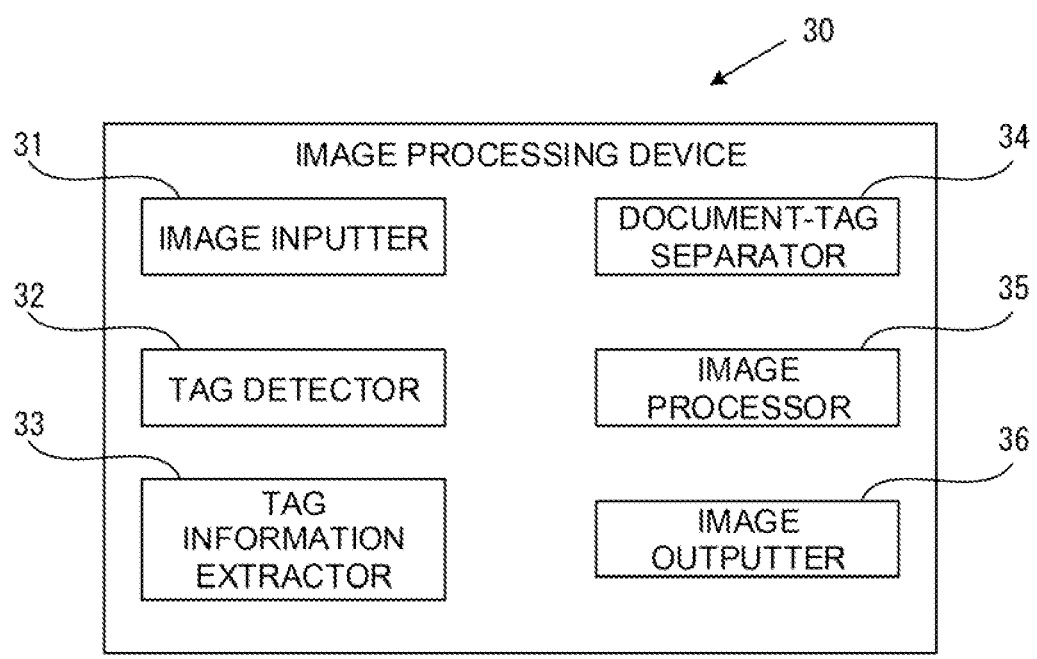
FIG. 2 is a block diagram illustrating an image processing device of the image forming apparatus of the first embodiment according to the present invention.

FIG. 2 is a block diagram illustrating the image processing device 30 according to the first embodiment.

The image processing device 30 includes an image inputter 31, a tag detector 32, a tag information extractor 33, a document-tag separator 34, an image processor 35, and an image outputter 36.

The image inputter 31 converts, based on an analog signal or a digital signal output by the image input device 20 to the image processing device 30, a signal into a digital signal to generate input image data. The image inputter 31 is not limited to the example described above, and may be an image inputter that receives image data from the outside and uses the received image data as input image data.

The tag detector 32 detects a tag in a read document image. Examples of a method of detecting a tag may include detecting an edge of a document sheet to determine whether there is a sheet edge protruding from a standard document sheet, and comparing an image of the tag in the read document image with an image of a tag in a tag standard table by using data registered in the standard table. The method also may be based on a shadow of an edge of the tag resulting from a step formed by the tag. A method of comparing the images may be any method such as a pattern recognition method. Further, the tag may be detected based on a difference between a color of the tag and a color of the document. These methods may be combined.

The tag information extractor 33 acquires tag information such as the color, size, and attachment position of the detected tag, and a content of a comment written on the detected tag.

According to the tag information, the document-tag separator 34 performs a process of separating the document and the tag from the document image with a tag to remove the tag image.

The image processor 35 performs an image process on input image data to generate image data. If the tag image is removed, a part of the original document image is missing. However, the image processor 35 generates an averaged and continuous background image, based on surrounding background values, to generate and embed a background image in the missing part of the document image. For the tag information, the image processor 35 generates a tag information image separately from the document.

The image outputter 36 outputs output image data generated by the image processing device 30 to the outside of the image processing device 30, in a form of electronic data.

Image Process on Document with Tag

An image process on a document with a tag by the image forming apparatus 1 according to the first embodiment will be described below.

Figure 3:
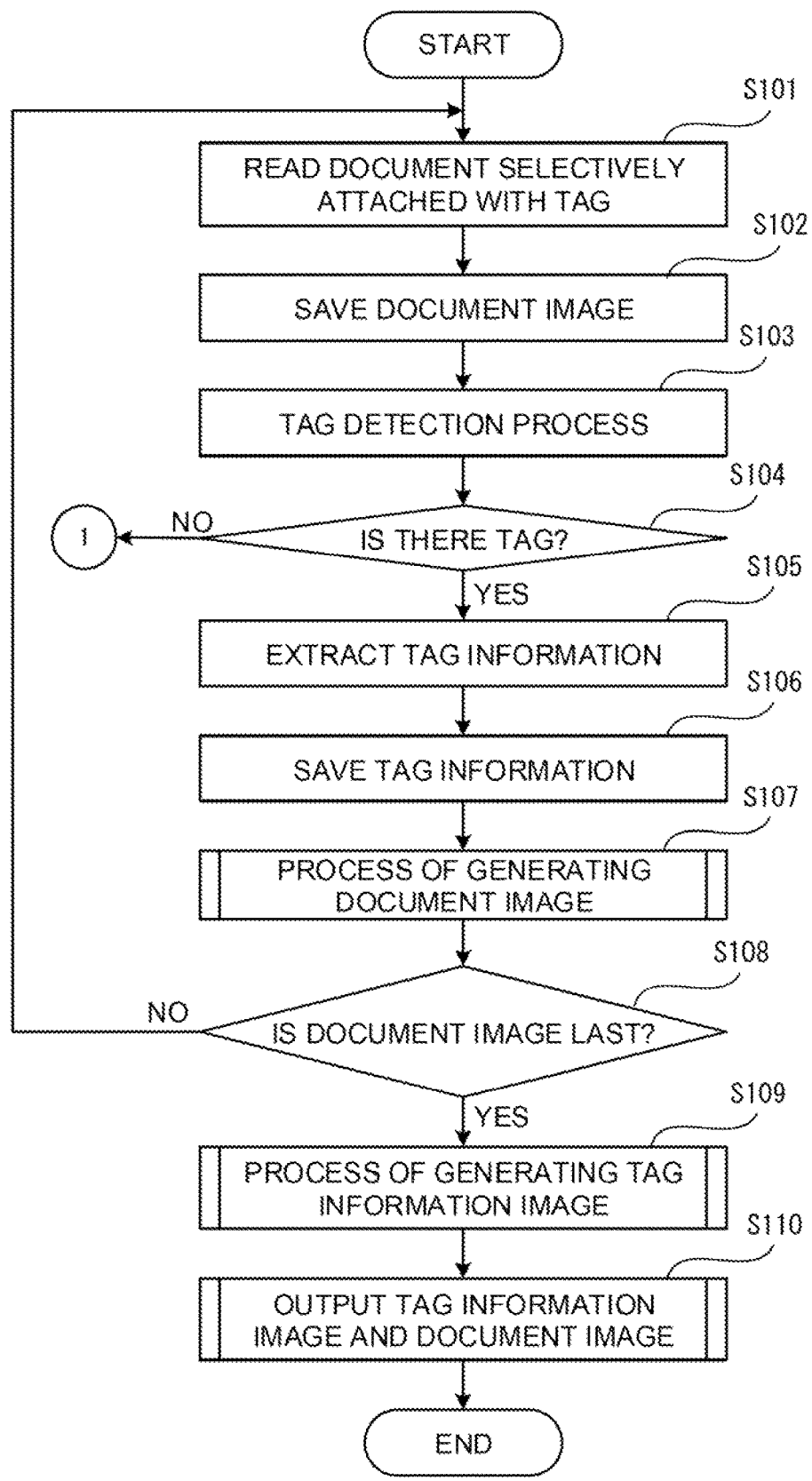
FIG. 3 is a flowchart illustrating an image process on a document with a tag by the image forming apparatus of the first embodiment according to the present invention.

FIG. 3 is a flowchart illustrating the image process on the document with a tag by the image forming apparatus 1 according to the first embodiment.

In the image process according to the first embodiment, a document with a tag is read to separately generate and output an original document image without the tag and an image in which tag information is written.

An image process performed when the image forming apparatus 1 reads documents with a tag illustrated in FIG. 7 will be described.

Figure 7:
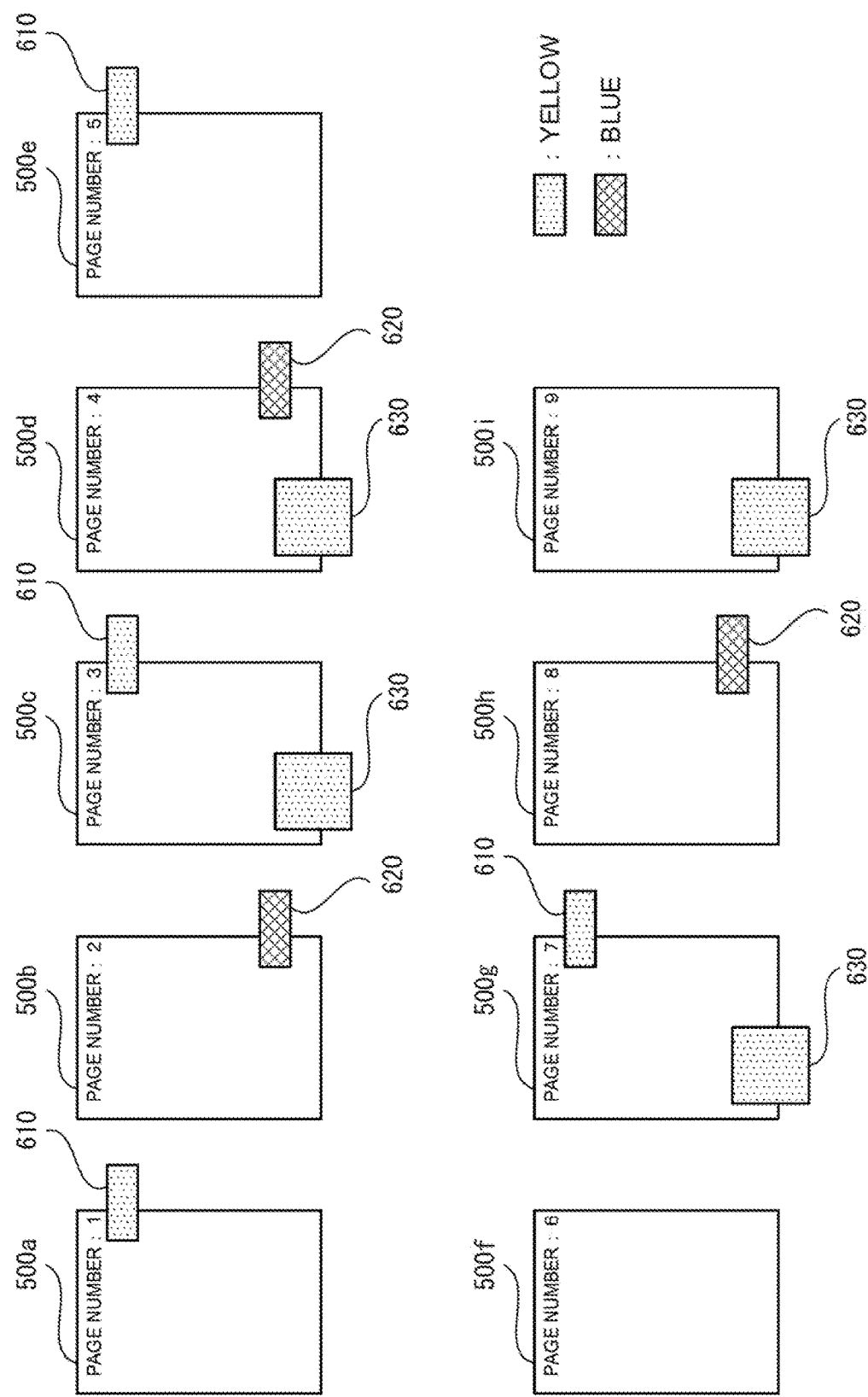
FIG. 7 is an explanatory diagram illustrating documents with a tag.

As illustrated in FIG. 7, a yellow tag 610, a blue tag 620, and a yellow tag 630 are attached to documents 500*a* to 500*i* having A4 size. There is also a document without a tag, such as the document 500*f*. The size of each of the tags is as follows.

Yellow tag 610: 20×60 mm
    Blue tag 620: 20×60 mm
    Yellow tag 630: 60×60 mm For example, it is assumed that the documents are a report material of a market research entrusted to a research company, and tags are attached to the documents as follows.

Figure 8:
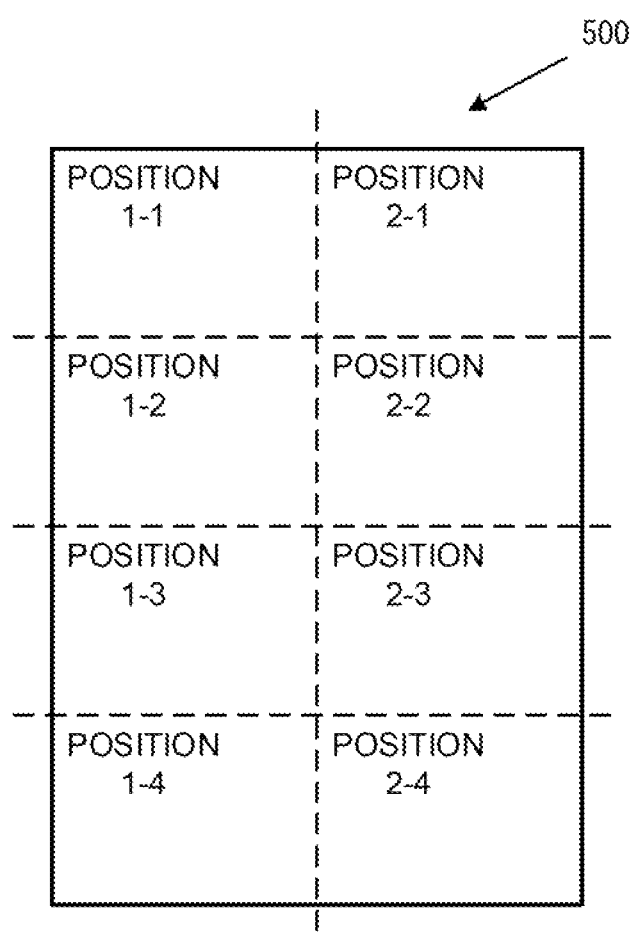
FIG. 8 is an explanatory diagram illustrating attachment positions of a tag in a document.

Yellow tag 610 for a document related to business A
    Blue tag 620 for a document related to business B
    Yellow tag 630 with a comment for a document having a request for a more extensive investigation into business A/business B As illustrated in FIG. 8, attachment positions of the tag are defined by dividing a document 500 into 2 columns and 4 rows to define positions 1-1 to 1-4 from the top of the left column, and positions 2-1 to 2-4 from the top of the right column. The yellow tag 610 (20×60 mm) for distinguishing the business A and the business B is attached to the position 2-1, the blue tag 620 (20×60 mm) for distinguishing the business A and the business B is attached to the position 2-4, and the yellow tag 630 (60×60 mm) including a comment is attached to the position 1-4.

The document, and the tag type and attachment position of the tag described above are merely examples, and the user may choose any tag type and attachment position according to the content of the document.

First, the image input device 20 of the image forming apparatus 1 optically reads an image of the document 500 with a tag and outputs the image as an analog signal to the image processing device 30 (step S101). The reading method may be a method in which documents are manually set one by one in the image input device 20, or a method of continuously reading a plurality of documents by using a mechanical auto document feeder (ADF). If the documents are read by using the auto document feeder (ADF), a sheet jam may occur during conveyance, and thus, a tag should be attached in a way that the tag does not protrude in an up-down direction and a front end direction of each of the documents during conveyance. The tag may be attached in a way that the tag is directed inward in the document. The image inputter 31 provided in the image processing device 30 converts the document into image data being a digital signal to receive the image data and temporarily save a document image being the image data in the storage device 40 (step S102).

If the image inputter 31 saves a document image with a tag selectively attached in the storage device 40, the image inputter 31 creates a folder and saves the document image as an image file in the folder. The document image is saved as an image having a rectangular non-standard size exactly accommodating the document image and the entire tag, or as an image having a standard size accommodating the document image and the entire tag. File names are numbered in the order of being read (referred to as a document reading number) to distinguish the files. An image including a plurality of pages, such as PDF data, may be saved as one file.

The tag detector 32 of the image processing device 30 detects a tag, based on a document image saved in the storage device 40 (step S103).

As described above, there are various methods for detecting a tag, and the tag is detected as follows, for example.

First, an edge of a sheet is detected from a document image with a tag. The document image with a tag is compared to a standard sheet size (for example, A4 and A3) to detected whether there is a protruding sheet edge, and if there is a protruding portion, a tag may exist in the protruding portion. A shadow in the periphery of the tag, a color difference or a density difference between the tag and the document, and the like are detected to detect a tag portion.

In the present embodiment, the tag has a rectangular shape, and thus, a rectangular portion of the tag is detected.

A preset tag standard components table saved in the storage device 40 may be used to make a comparison in image with a detected rectangular portion, if there is a match with the rectangular portion, the rectangular portion may be detected as a tag. A method of comparing the images may be any method such as a pattern recognition method.

In the tag standard components table, main tag types may be factory-registered in advance by a manufacturer, or a user may arrange tags to be used by the user on a scanner mounted in a multifunction peripheral to read and register the tags as user-specified tags. Similarly, in a tag attachment position table, types of tag to be used and divisions for each sheet size may be factory-registered by a manufacturer, or a user may set the divisions through an operation panel or the like.

If a tag is detected, the tag detector 32 determines that there is a tag (step S104; YES), and the process proceeds to step S105. If a tag is not detected, the tag detector 32 determines that there is no tag (step S104; NO), and the process proceeds to step S124 in the process of generating a document image in FIG. 4 (described in detail below). Even when a tag may be detected, if the tag standard components table does not include the detected tag, the result may be displayed and a determination may be made that there is no tag.

In step S105, the tag information extractor 33 uses the tag standard components table and the tag attachment position table registered in advance and saved in the storage device 40, to extract information about whether the document includes a tag, a type (a size and a color) of the tag, and an attachment position of the tag, as tag information of the document. The tag information extractor 33 also converts a character string of a comment written on the tag into text data and extracts the text data as tag information. The extracted tag information is associated with the document reading number mentioned above, converted into information of a database, and generated as a file. If a document page is written on the document, the number of the page written on the document may be converted into text data to obtain the document page, and the text data may be generated as tag information relating to the document page. In the present embodiment, the text data is generated as tag information relating to the document page.

The tag information extractor 33 temporarily saves the tag information converted into text data in a folder of the storage device 40 in which the read document image is temporarily saved (step S106). If the document image is not temporarily saved and there is no folder for the document image, the tag information extractor 33 creates a new folder in the storage device 40 to temporarily save the document image.

The image processor 35 performs a process of generating the document image in which the tag is removed from the document image with a tag and the resultant document image is output (step S107). The image processor 35 creates an output image folder in a folder of the storage device 40 including the read document image and temporarily saves therein the document image obtained by removing the tag and a document image that originally does not include a tag, as document images without a tag. If the document image is not temporarily saved and there is no folder for the document image, the image processor 35 creates a new folder in the storage device 40 to temporarily save the document image.

Step S107 will be described in detail later.

The image processor 35 confirms whether the document image is the last document image (step S108), and if the document image is the last image (step S108; YES), the process proceeds to step S109. If the document image is not the last image (step S108; NO), the process returns to step S101.

In step S109, the image processor 35 performs a process of generating the tag information image to be output, based on the tag information. The image processor 35 saves the tag information image in a folder in which a document image without a tag is saved. Thus, the image processor 35 associates the tag information image with the document image.

Step S109 will be described in detail later.

In step S110, the image outputter 36 outputs the associated tag information image and document image without a tag, and uses the image output device 50 to print the associated tag information image and document image without a tag on a sheet. The document image without a tag may be output to an external storage medium such as a USB memory, another device, or the storage device 40 of the image forming apparatus 1. If the document image without a tag is output to the storage device 40, a folder not being a folder for temporary storage is created and the document image without a tag is saved therein.

Step S110 will be described in detail later.

Next, the process of generating the document image in step S107 will be described in detail with reference to FIGS. 4, 9A to 9C, and 10.

Figure 4:
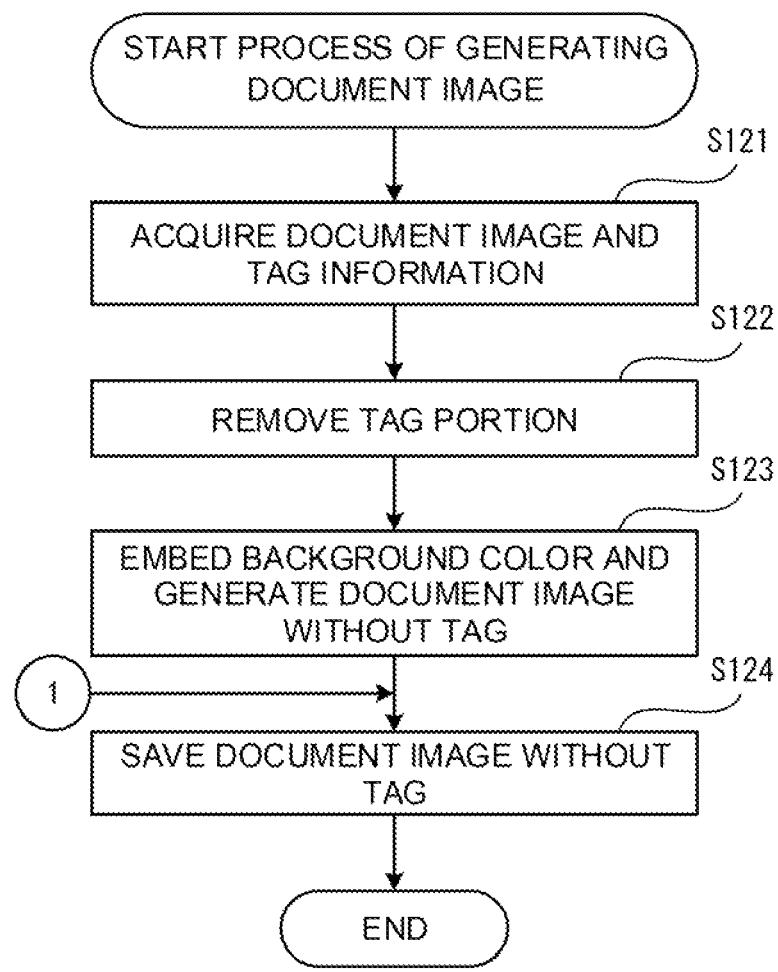
FIG. 4 is a flowchart illustrating a process of generating a document image by the image processing device of the first embodiment.
Figure 9A:
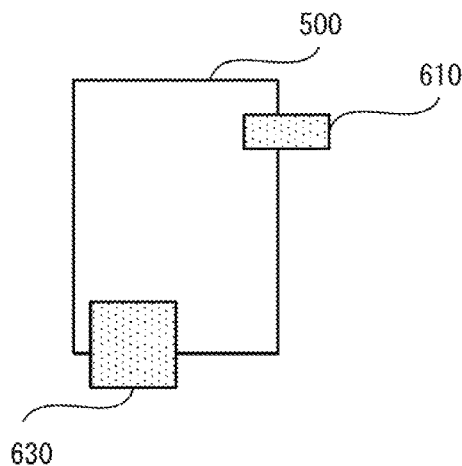
FIGS. 9A to 9C are explanatory diagrams for describing a process of removing a tag image from a document image with a tag.
Figure 9B:
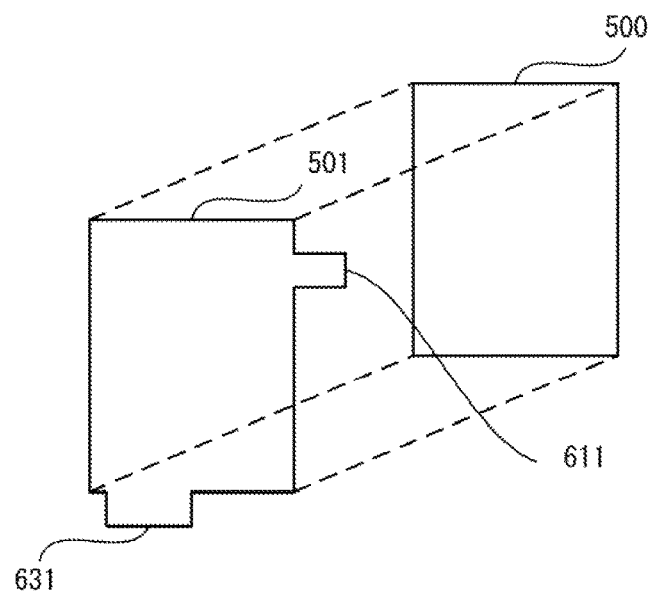
Figure 9C:
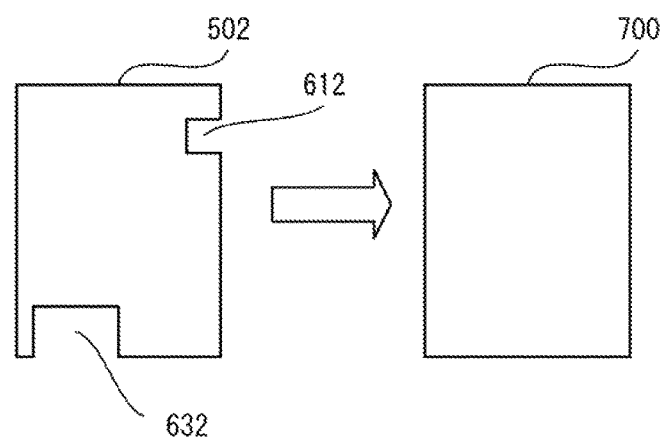

FIG. 4 is a flowchart illustrating a process of generating a document image by the image processing device 30. FIGS. 9A to 9C are explanatory diagrams for describing a process of removing a tag image from a document image with a tag. FIG. 10 is an explanatory diagram illustrating an output tag information image and an output document image.

The image processor 35 of the image processing device 30 acquires the document image and the tag information from the read document image folder of the storage device 40 (step S121). According to the tag information, the image processor 35 removes a tag portion from a document image with a tag (step S122). If the tag portion is removed, a part of the original document image is missing. However, the image processor 35 generates an averaged and continuous background image, based on surrounding background values, to generate and embed a background image in the missing part of the document image to generate a document image without a tag. Thus, the original document image to which no tag is attached is restored (step S123). The image processor 35 creates a folder to save the generated document image without a tag as a file, and in this process, the image processor 35 creates an output document folder in a read document folder of the storage device 40 to sequentially save document image files without a tag in the output document folder (step S124). If the document image is not temporarily saved and there is no folder for the document image, the image processor 35 creates a new folder in the storage device 40 to save the document image. Document images without a tag may be sequentially added to and saved in one file, as processed in a PDF file. If it is determined in step S104 that there is no tag, the process of removing the tag is not performed, and the unchanged image data is saved as a document image without a tag in step S124.

Next, the process of removing the tag image in step S122 is described in detail with reference to FIGS. 9A to 9C. FIG. 9A illustrates an example of a document image with tags. It is assumed that the yellow tags 610 and 630 are attached to the document 500.

As illustrated in FIG. 9B, if detecting an edge of a document image 501 including tags, the image processor 35 may extract portions 611 and 631 protruding from the size of the document 500. The image processor 35 may detect a rectangular portion of the tag, based on the color or edge portion of the tag and a tag components table. Therefore, as illustrated in FIG. 9C, a document image 502 from which the tag image is removed is generated. A portion at which the yellow tag 610 is removed is referred to by reference numeral 612, and a portion at which the yellow tag 630 is removed is referred to by reference numeral 632. In the removed portions (missing portions of the document) 612 and 632, an averaged and continuous background image is generated from surrounding background values of the document 500 to generate and embed a background image in the removed portions 612 and 632 of the document image 502 to generate a document image 700 without a tag. Thus, the original document 500 without a tag can be restored.

Next, a process of generating the tag information image in step S109 will be described.

Figure 5:
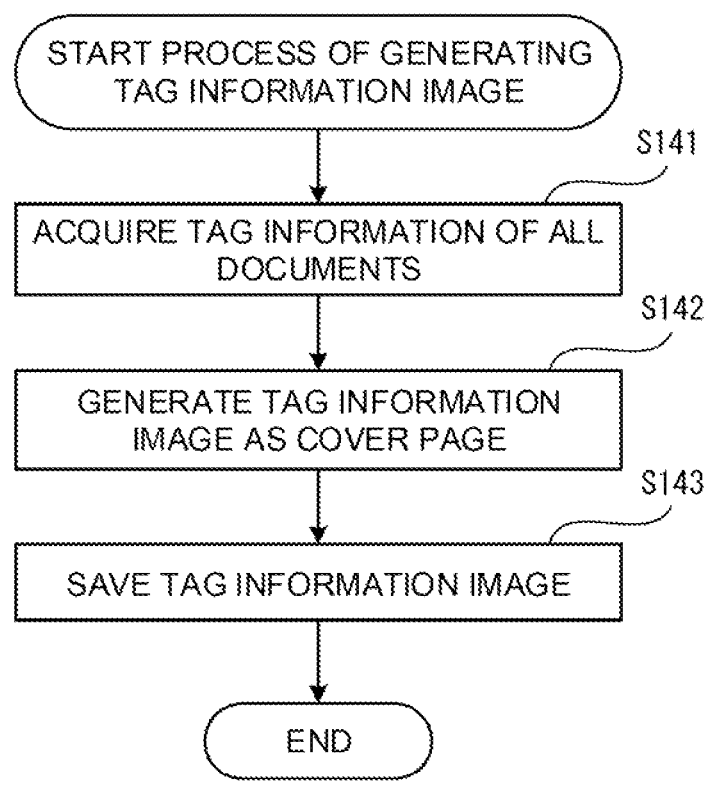
FIG. 5 is a flowchart illustrating a process of generating a tag information image by the image processing device of the first embodiment.

FIG. 5 is a flowchart illustrating the process of generating the tag information image by the image processing device 30.

First, tag information is acquired from the read document folder of the storage device 40 (step S141). The image processor 35 generates, as a tag information image, a cover page on which tag information about all of the read documents is written (step S142). The tag information image is an image completely different from the document image without a tag and is tag information attached to the document image without a tag, and thus, the tag information image is utilized as the cover page of the document image without a tag.

FIG. 10 illustrates an example of a tag information image 750. The tag information image 750 is an image in which information about a tag attached to each document is summarized, and includes a tag type, a document page to which a tag is attached, an attachment position, and a comment.

The image processor 35 saves the generated tag information image 750 in the output image folder of the storage device 40 (step S143). If the tag information image and the document image without a tag are saved in one folder, the tag information image and the document image without a tag can be associated. The tag information image may be added at any position in a file such as a PDF file that summarizes document images without a tag of each page in one file.

Figure 6:
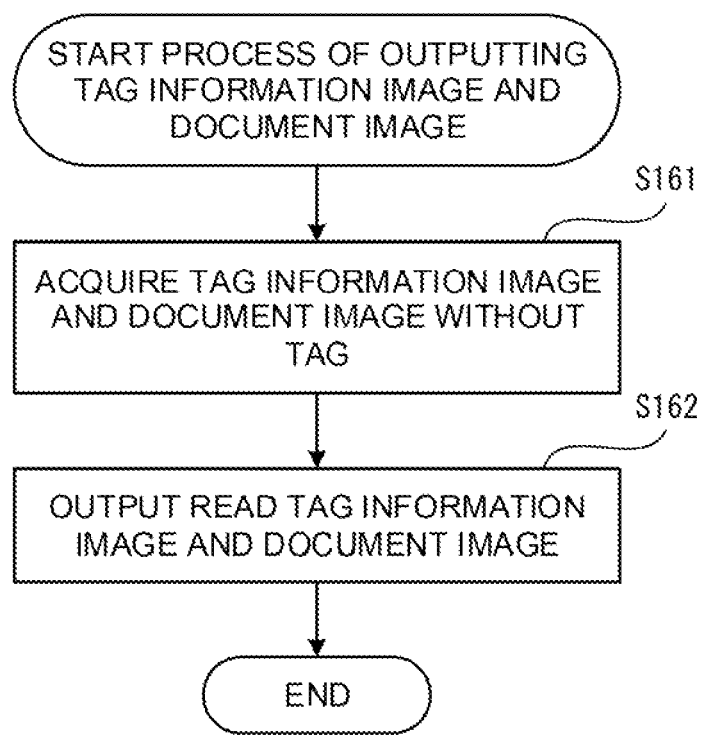
FIG. 6 is a flowchart illustrating a process of outputting the tag information image and the document image.

Next, a process of outputting the tag information image and the document image in step S110 will be described. FIG. 6 is a flowchart illustrating the process of outputting the tag information image and the document image.

The image outputter 36 acquires the tag information image 750 and document images 700a to 700i without tags from the output image folder of the storage device 40 (step S161) and outputs the tag information image 750 and the document images 700a to 700i to the image output device 50, and the image output device 50 outputs (prints) the tag information image 750 and the document images 700a to 700i on a sheet (step S162). The tag information image and the document images may be output to an external storage medium such as a USB memory, another device, or the storage device 40 of the image forming apparatus 1. If the tag information image and the document images are output to the storage device 40, a folder not being a folder for temporary storage is created and the tag information image and the document image are saved therein.

As illustrated in FIG. 10, after the tag information image 750 is printed as the cover page, the document images 700a to 700i are printed in this order.

Therefore, if a normal copy function is used, a document is copied in a state where a tag is attached to the document, and thus, the original document cannot be maintained, but the present invention can solve this problem.

Documents are output in a state where the tag information is summarized on a cover page of the first page of the original documents, and thus, the documents can be output in a state where a page order of the documents is maintained. In this example, a report material of a market research entrusted to a research company can be output in a document format by which it is possible to focus on the content relating to the business A or the business B of interest by looking at the content of the cover page, with maintaining the original style of the report material submitted by the reporting company.

Second Embodiment

In a second embodiment of the present invention, the image forming apparatus including the image processing device according to the present invention reads document images with a tag, groups the read document images, and outputs the resultant document images.

An image process on a document with a tag by an image forming apparatus according to the second embodiment will be described below.

Figure 11:
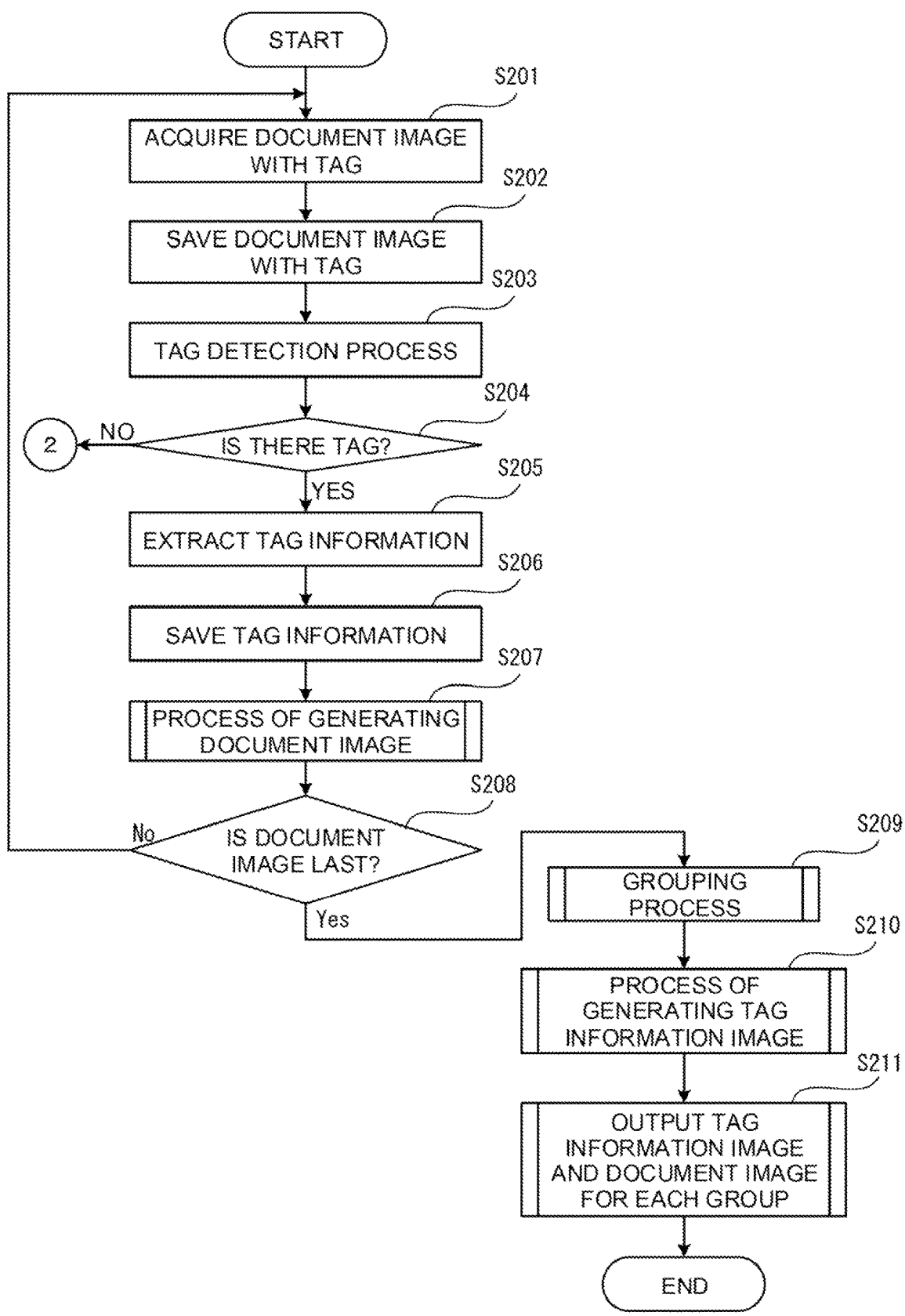
FIG. 11 is a flowchart illustrating an image process on a document with a tag by an image forming apparatus of a second embodiment according to the present invention.
Figure 12:
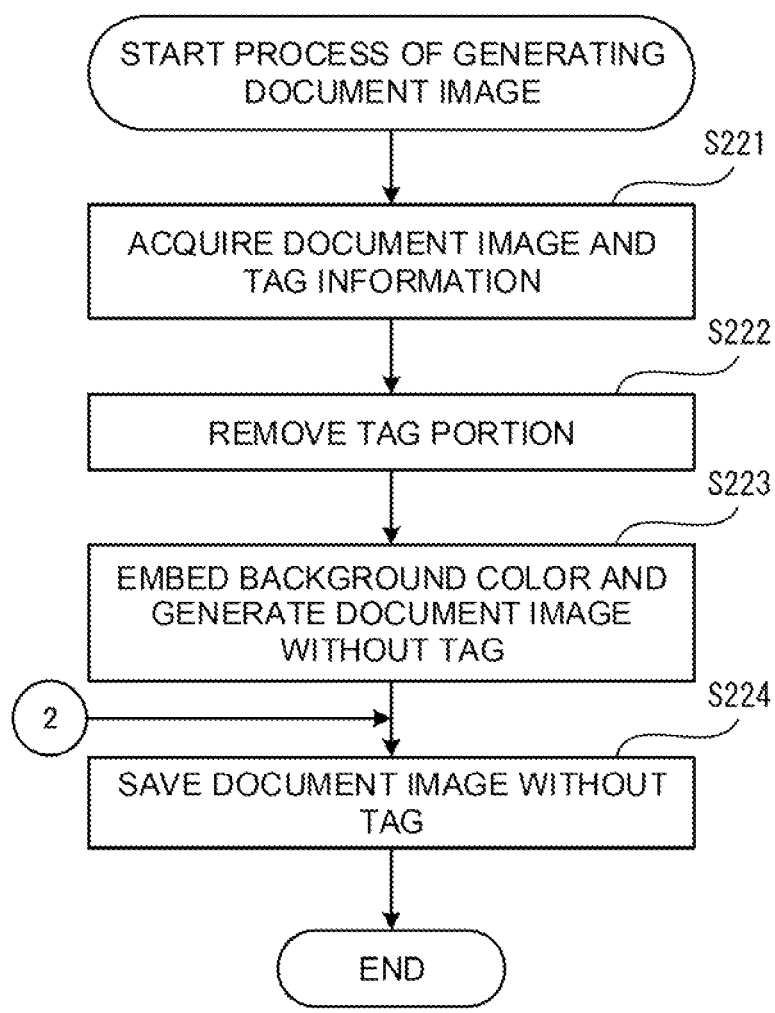
FIG. 12 is a flowchart illustrating a process of generating a document image by an image processing device of the second embodiment.

FIG. 11 is a flowchart illustrating the image process on the document with a tag by the image forming apparatus according to the second embodiment. FIG. 12 is a flowchart illustrating a process of generating a document image by the image processing device of the second embodiment.

It is assumed that, in a grouping process, a user displays a grouping process screen through an operation panel to perform a setting and a process operation.

Steps S201 to S208 are the same as steps S101 to S108 in FIG. 3, and thus, description thereof will be omitted. Steps S221 to S224 in FIG. 12 are the same as steps S121 to S124 in FIG. 4, and thus, description thereof will be omitted.

In step S208, if the document image is the last document image (step S208; YES), the image processor 35 performs a grouping process of documents, based on the tag information (step S209). After that, a tag information image of the grouped documents is generated (step S210). The tag information image and the document images are output for each group (step S211).

Figure 13:
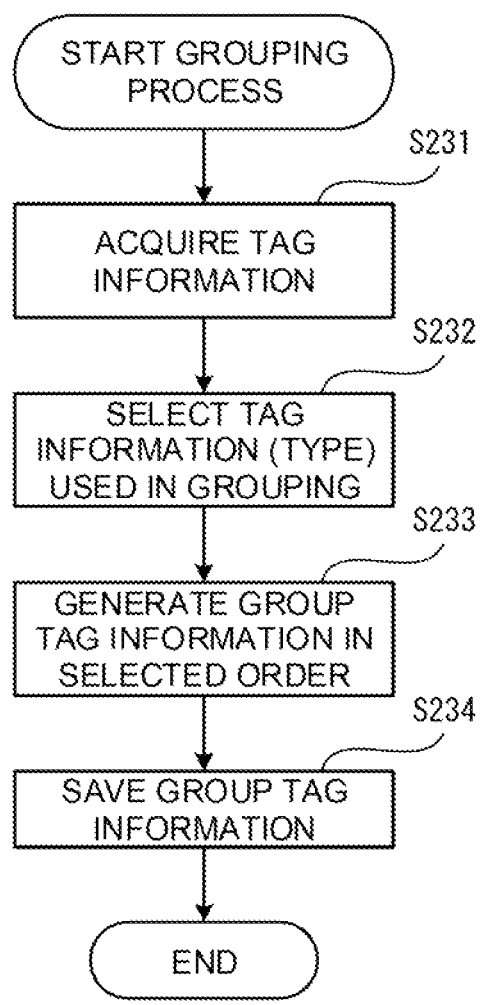
FIG. 13 is a flowchart illustrating a grouping process by the image processing device of the second embodiment.

Next, the grouping process in step S209 will be described. FIG. 13 is a flowchart illustrating the grouping process.

The image processor 35 acquires tag information from the read document image folder of the storage device 40 (step S231), and selects tag information to be used for the grouping according to a grouping setting (step S232). The grouping setting is set as a setting in which documents are grouped in an order according to the type of tag information. According to the grouping setting, the image processing device 30 automatically selects a tag type to be used in the grouping, based on the tag information of the entire documents, and proceeds with the process. The grouping setting can be set by a user via the operation panel 10. The user may select an item of the tag information from the operation panel 10 so that the process proceeds in accordance with the selected item.

It is assumed that the image processor 35 sequentially selects the tag type of the tag information according to the grouping setting. That is, it is assumed that the tag type is selected in the following order:

Yellow tag 610: 20×60 mm
Blue tag 620: 20×60 mm
Yellow tag 630: 60×60 mm The image processor 35 generates tag information for each group, that is, group tag information in the selected order (step S233). The image processor 35 creates a group folder in the output image folder of the storage device 40 and saves the group tag information in the group folder (step S224). Based on the group tag information, a document image without a tag corresponding to the group is also saved in the group folder. Thus, a folder is created for each group, and a document image without a tag associated with the group tag information of each group is saved in the folder.

Next, a process of generating a tag information image will be described.

Figure 14:
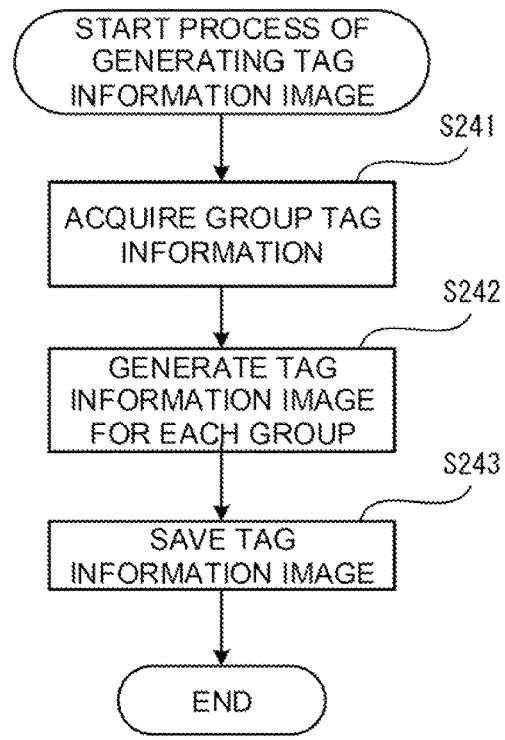
FIG. 14 is a flowchart illustrating a process of generating a tag information image by the image processing device of the second embodiment.

FIG. 14 is a flowchart illustrating the process of generating the tag information image.

The image processor 35 acquires group tag information from the storage device 40 (step S241) and generates a group tag information image, based on the group tag information (step S242). After that, the image processor 35 saves the group tag information image in the group folder of the storage device 40 (step S243). Thus, the group tag information image is also saved in each group folder.

Next, a process of outputting a tag information image and a document image will be described.

Figure 15:
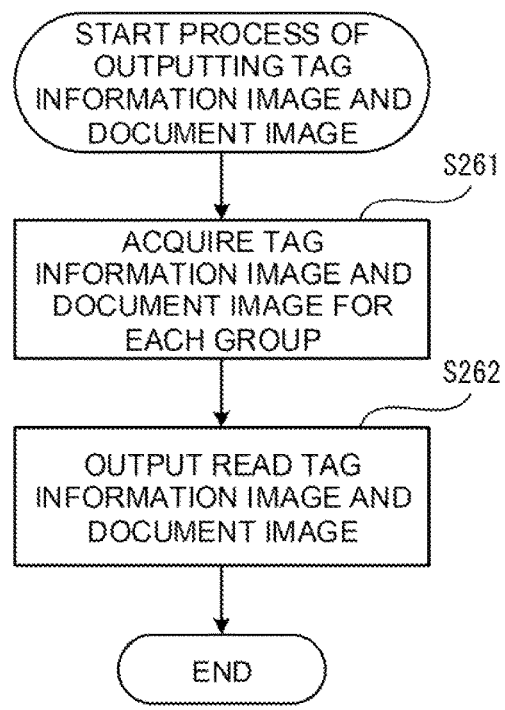
FIG. 15 is a flowchart illustrating a process of outputting a tag information image and a document image by the image processing device of the second embodiment.

FIG. 15 is a flowchart illustrating the process of outputting the tag information image and the document image.

The image outputter 36 acquires a tag information image and a document image without a tag for each group from each group folder (step S261) and outputs the tag information image and the document image to the image output device 50, and the image output device 50 outputs (prints) the tag information image and the document image on a sheet (step S262). The tag information image and the document image may be output to an external storage medium such as a USB memory, another device, or the storage device 40 of the image forming apparatus 1. If the tag information image and the document image are output to the storage device 40, a folder not being a folder for temporary storage is created and the tag information image and the document image are saved therein.

The output tag information image and the output document image will be described.

FIGS. 16 to 18 are explanatory diagrams illustrating a tag information image and document images grouped for each tag type.

FIG. 16 is an explanatory diagram illustrating a group of the yellow tag 610 (20×60 mm), in which a tag information image 751 is generated as a cover page. FIG. 16 includes, at a part with a double circle, tag information of the yellow tag 610, that is, a tag type (a color and a size), a document page to which the tag is attached, and a position where the tag is attached. Tag information of the yellow tag 630 on which a comment is written is also written in FIG. 16. The document images 700*a*, 700*c*, 700*e*, and 700*g* without a tag are generated in association with the tag information image 751 being the cover page.

FIG. 17 is an explanatory diagram illustrating a group of the blue tag 620 (20×60 mm), in which a tag information image 752 is generated as a cover page. FIG. 17 includes, at a part with a double circle, tag information of the blue tag 620, that is, a tag type (a color and a size), a document page to which the tag is attached, and a position where the tag is attached. Tag information of the yellow tag 630 on which a comment is written is also written in FIG. 17. The document images 700*b*, 700*d*, and 700*h* without a tag are generated in association with the tag information image 752 being the cover page.

FIG. 18 is an explanatory diagram illustrating a group of the yellow tag 630 (60×60 mm), in which a tag information image 753 is printed as a cover page. FIG. 18 includes, at a part with a double circle, tag information of the yellow tag 630, that is, a tag type (a color and a size), a document page to which the tag is attached, and a position where the tag is attached. Tag information of the yellow tag 630 further includes contents of a comment. The document images 700*c*, 700*d*, 700*g*, and 700*i* without a tag are generated in association with the tag information image 753 being the cover page.

As illustrated in the figures, regarding the tag information images and the document images of FIGS. 16 to 18, the tag information image is printed as the cover page, and subsequently, the document images associated with the tag information image are printed and the tag information image and the document images are grouped. The tag information image and the document images may be output to an external storage medium such as a USB memory, another device, or the storage device 40 of the image forming apparatus 1. If the tag information image and the document images are output to the storage device 40, a folder not being a folder for temporary storage is created and the tag information image and the document images are saved therein. If the tag information image and the document images are output as a file, the tag information image and the document images are saved as follows so that groups can be distinguished.

(1) Storage by folder,
(2) Classification by file name,
(3) Storage both the tag information image and the document images in page order, as in a PDF file, with the tag information image 751-753 placed on the first page.

This method of generating data uses information of the tag information managed in the previous step. The tag information image and the document images are grouped for each tag type, and only a document including page information written in the tag information is extracted. Thus, if the cover page includes the tag information, only a page to which the tag is attached is extracted. By repeating the extraction until the entire tag information is processed, it is possible to output a material in which pages related to the tags are grouped.

Thus, the document pages are grouped, based on the tag information, to output a material in which related document pages are extracted. The advantage of this output scheme for the user is that the user can obtain only necessary information. In this case, it is possible to provide only a necessary portion of the report material of a market research entrusted to a research company, to a leader of the business A and a leader of the business B. Further, it is possible to request the research company to more extensively investigate a certain page according to a comment of a tag. The information of a tag on which a comment is written is also included as a comment in the extracted materials handed to each of the leader of the business A and the leader of the business B, and thus, it is possible to inform the leader of the business A and the leader of the business B that more extensive research information will be provided at a later date. Conversely, it is also possible to use this technique not to disclose information about the business B to the leader of the business A.

A program operating in the image processing device according to the present invention may be a program that controls a central processing unit (CPU) or the like (a program that causes a computer to function) to realize a function of the above-described embodiment according to the present invention. Information handled by these devices is temporarily stored in a random access memory (RAM) during processing of the information, and subsequently stored in various types of ROMs such as a flash read only memory (ROM) or a hard disk drive (HDD), and is read, corrected, and written by the CPU as needed. A program for realizing a function of each configuration may be recorded on a computer-readable recording medium, and a computer system may be caused to read and execute the program recorded on the recording medium to perform a process of each component. The "computer system" mentioned here includes an OS and hardware such as a peripheral device.

Preferred embodiments of the present invention have been described above with reference to the accompanying drawings. However, the present invention is of course not limited to these examples. It is clear that a person skilled in the art can contrive various types of modifications or amended examples within the categories described in the scope of the claims, and these modifications and amended examples are naturally to be interpreted as belonging to the technical scope of the present invention.

What is claimed is:

1. An image processing device for reading a plurality of documents selectively attached with a tag to generate document images and processing the generated document images, the image processing device comprising:
    a tag information extractor that extracts tag information about a tag from the document images;
    an image processor that removes, based on the tag information, a tag from document images with a tag to generate document images as document images without a tag, generates a tag information image in which the tag information is written, and associates the document images without a tag with the tag information image, the tag information image being a cover page image that includes, for each tag type, a plurality of document page numbers to which the tag is attached, and tag positions in the document images, wherein each of the tag positions is associated with a respective one of the plurality of document page numbers; and
    an image outputter that outputs the associated document images without a tag and tag information image.

2. The image processing device according to claim 1, wherein the image processor groups the document images without a tag, based on the tag information, and generates the document images without a tag and the tag information image in an associated manner for every group.

3. The image processing device according to claim 2, wherein the image outputter first outputs the tag information image as an image different from the document images without a tag, and outputs the document images without a tag associated with the tag information image.

4. The image processing device according to claim 2, wherein the tag information extractor extracts information including at least any one of a color, a size, and an attachment position of a tag and uses the extracted information as tag information.

5. The image processing device according to claim 2, wherein the tag information extractor converts a character string written on a tag into text data and uses the text data as tag information.

6. The image processing device according to claim 2, wherein the image processor removes a tag portion from the document images with a tag and complements a portion where the tag portion is removed by a background of the document images to generate the document images without a tag.

7. The image processing device according to claim 1, wherein the image outputter first outputs the tag information image as an image different from the document images without a tag, and outputs the document images without a tag associated with the tag information image.

8. The image processing device according to claim 1, wherein the tag information extractor extracts information including at least any one of a color, a size, and an attachment position of a tag and uses the extracted information as tag information.

9. The image processing device according to claim 1, wherein the tag information extractor converts a character string written on a tag into text data and uses the text data as tag information.

10. The image processing device according to claim 1, wherein the image processor removes a tag portion from the document images with a tag and complements a portion where the tag portion is removed by a background of the document images to generate the document images without a tag.

11. An image processing method for reading a plurality of documents selectively attached with a tag to generate document images and processing the generated document images, the image processing method comprising:
    extracting tag information about a tag from the document images;
    removing, based on the tag information, a tag from the document images with a tag to generate document images as document images without a tag, generating a tag information image in which the tag information is written, and associating the document images without a tag with the tag information image, the tag information image being a cover page image that includes, for each tag type, a plurality of document page numbers to which the tag is attached, and tag positions in the document images, wherein each of the tag positions is associated with a respective one of the plurality of document page numbers; and
    outputting the associated document images without a tag and tag information image.

* * * * *